US010777012B2

(12) United States Patent
Goergen et al.

(10) Patent No.: US 10,777,012 B2
(45) Date of Patent: Sep. 15, 2020

(54) DISPLAY SYSTEMS IN AN ENTERTAINMENT ENVIRONMENT

(71) Applicant: Universal City Studios LLC, Universal City, CA (US)

(72) Inventors: Patrick J. Goergen, Orlando, FL (US); Danielle M. Holstine, Winter Garden, FL (US); Thierry Coup, Orlando, FL (US); Brian McQuillian, Orlando, FL (US); Justin Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/174,263

(22) Filed: Oct. 29, 2018

(65) Prior Publication Data
US 2020/0105061 A1 Apr. 2, 2020

Related U.S. Application Data

(60) Provisional application No. 62/737,275, filed on Sep. 27, 2018.

(51) Int. Cl.
*G06T 19/00* (2011.01)
*G06T 15/00* (2011.01)
(Continued)

(52) U.S. Cl.
CPC .............. *G06T 19/006* (2013.01); *G02B 1/11* (2013.01); *G02B 27/0172* (2013.01);
(Continued)

(58) Field of Classification Search
CPC .......... G06T 19/006; G02B 2027/0134; G02B 27/017; G02B 27/22; G02B 27/2264; H04N 13/341; H04N 9/3147; G06F 3/1446
See application file for complete search history.

(56) References Cited

U.S. PATENT DOCUMENTS 6,462,769 B1 10/2002 Trowbridge et al.
2010/0079585 A1 4/2010 Nemeth et al.
(Continued)

FOREIGN PATENT DOCUMENTS

CN 103472909 12/2013
CN 103657118 3/2014
(Continued)

OTHER PUBLICATIONS

Forget VR, Microsoft is all about 3D and mixed reality; https://www.cnet.com/news/forget-vr-microsoft-is-all-about-the-3d-and-mr-mixed-reality/; access date May 1, 2018; pp. 1-2.
(Continued)

*Primary Examiner* — Jeffery A Brier
(74) *Attorney, Agent, or Firm* — Fletcher Yoder, P.C.

(57) ABSTRACT

An augmented reality (AR) and 3-dimensional (3-D) viewing system for providing an AR and 3-D experience to a user includes a wearable visualization device having a viewing assembly through which the user is capable of viewing a real-world environment. The viewing assembly includes a first display configured to display one or more AR features and a 3-D viewing component that enables the user to perceive one or more coded 2-dimensional (2-D) images as one or more deciphered 3-D features. The AR and 3-D viewing system also includes a fixed 3-D display system having a second display configured to display the one or more coded 2-D images. The fixed 3-D display system is disposed within the real-world environment.

18 Claims, 5 Drawing Sheets

(51) Int. Cl.
*G02B 27/01* (2006.01)
*G02B 1/11* (2015.01)
*G02F 1/137* (2006.01)
*G02B 30/24* (2020.01)
*G02B 30/25* (2020.01)
*A63G 31/00* (2006.01)

(52) U.S. Cl.
CPC ............. *G02B 30/24* (2020.01); *G02B 30/25* (2020.01); *G02F 1/137* (2013.01); *G06T 15/005* (2013.01); *A63G 31/00* (2013.01); *G02B 2027/0134* (2013.01)

(56) References Cited

U.S. PATENT DOCUMENTS

| | | |
|---|---|---|
| 2010/0302464 A1 | 12/2010 | Raring et al. |
| 2011/0213664 A1 | 9/2011 | Osterhout et al. |
| 2011/0248904 A1* | 10/2011 | Miyawaki ............ G02B 27/017 345/7 |
| 2011/0267437 A1* | 11/2011 | Abeloe ................ H04N 13/341 348/51 |
| 2012/0004919 A1 | 1/2012 | Muth |
| 2012/0313955 A1 | 12/2012 | Choukroun |
| 2013/0083008 A1 | 4/2013 | Geisner et al. |
| 2013/0278631 A1 | 10/2013 | Border et al. |
| 2013/0300637 A1 | 11/2013 | Smits et al. |
| 2014/0267941 A1 | 9/2014 | Ellsworth |
| 2015/0002374 A1 | 1/2015 | Erinjippurath et al. |
| 2015/0123996 A1* | 5/2015 | Ohashi ................ G02B 27/017 345/633 |
| 2015/0170419 A1* | 6/2015 | Ohashi ..................... G09G 5/00 345/419 |
| 2015/0301592 A1 | 10/2015 | Miller |
| 2015/0358539 A1 | 12/2015 | Catt |
| 2016/0011422 A1 | 1/2016 | Thurber et al. |
| 2016/0048203 A1 | 2/2016 | Blum et al. |
| 2016/0167672 A1 | 6/2016 | Krueger |
| 2016/0371884 A1 | 12/2016 | Benko et al. |
| 2016/0373731 A1 | 12/2016 | Smoot et al. |
| 2017/0323482 A1* | 11/2017 | Coup ....................... A63G 7/00 |
| 2018/0033199 A9 | 2/2018 | Eatedali et al. |
| 2018/0054612 A1* | 2/2018 | Kim ..................... H04N 13/302 |
| 2018/0192042 A1* | 7/2018 | Stolzberg ............. H04N 13/302 |

FOREIGN PATENT DOCUMENTS

| | | |
|---|---|---|
| CN | 205003369 | 1/2016 |
| CN | 105828021 | 8/2016 |
| CN | 106101689 | 11/2016 |
| CN | 106331682 | 1/2017 |
| CN | 106371210 | 2/2017 |
| CN | 106371211 | 2/2017 |
| CN | 106371586 | 2/2017 |
| CN | 106483814 | 3/2017 |
| CN | 106693361 | 5/2017 |
| CN | 206348604 | 7/2017 |
| CN | 107016730 | 8/2017 |
| CN | 107027015 | 8/2017 |
| CN | 206584583 | 10/2017 |
| CN | 107399276 | 11/2017 |
| CN | 206788558 | 12/2017 |
| CN | 107561710 | 1/2018 |
| CN | 107561714 | 1/2018 |
| CN | 207059896 | 3/2018 |
| WO | 2016/025962 | 2/2016 |
| WO | 2018036741 | 3/2018 |

OTHER PUBLICATIONS

Magic Leap One: All the details on the hyped up mixed reality glasses; https://www.wareable.com/ar/magic-leap-need-to-know-release-date-price-specs-features; access date May 1, 2018; pp. 1-7.
Meta Company; The World's Most Immersive AR Experience; https://buy.metavision.com/48 utm_source=google_adwords&utm_medium=cpc&ads_cmpid=930592266&ads_adid=45669515439&ads_matchtype=e&ads_network=g&ads_creative=222849298500&utm_term=meta%20ar%20glasses&ads_targetid=kwd-387119165724&utm_campaign=&utm_source=adwords&utm_medium=ppc&ttv=2&gclid=EAIaIQobChMIx_in26yZ2QIVIoTICh0fAwe-EAAYASAAEgldq_D_BwE; access date May 1, 2018; pp. 1-15.
Hoopes, Heidi; Technical Illusions Debuts Cast AR Augmented Reality Glasses; https://newatlas.com/3d-augmented-reality-castar-maker-faire/29149/; Sep. 23, 2013; access date May 1, 2018; pp. 1-3.
PCT/US2017/031371 International Search Report and Written Opinion dated Jul. 21, 2017.
PCT/US2019/051777 International Search Report and Written Opinion dated Nov. 18, 2019.

* cited by examiner

DISPLAY SYSTEMS IN AN ENTERTAINMENT ENVIRONMENT

CROSS-REFERENCE TO RELATED APPLICATION

This application claims priority from and the benefit of U.S. Provisional Application No. 62/737,275, entitled "DISPLAY SYSTEMS IN AN ENTERTAINMENT ENVIRONMENT," filed Sep. 27, 2018, which is hereby incorporated by reference in its entirety for all purposes.

BACKGROUND

The subject matter disclosed herein relates to entertainment environments, and more specifically, to providing augmented reality (AR) and 3-dimensional (3-D) experiences in amusement park attractions.

Amusement parks and/or theme parks may include various entertainment attractions, restaurants, and rides useful in providing enjoyment to guests (e.g., families and/or people of all ages) of the amusement park. Areas of the amusement park may have different themes that are specifically targeted to certain audiences. For example, certain areas may include themes that are traditionally of interest to children, while other areas may include themes that are traditionally of interest to more mature audiences. Generally, locations having themes associated with such an amusement park may be referred to as an attraction or a themed attraction.

Themed attractions may be established using fixed equipment, building layouts, props, decorations, and so forth, most of which may generally relate to a certain theme. In situations where a different theme is to be established in the same location, the features associated with an older theme may be replaced with features associated with a newer theme. Depending on the complexity of the location's theme, this may prove to be very difficult and time-consuming, because decorations, furniture, equipment, props, and so forth may be removed or replaced. Indeed, for certain types of attractions, relatively complex themes have become more common to provide guests with more immersive experiences.

It is now recognized that it is desirable to include attractions where it may be possible to change attraction themes, or to include certain themed features in such attractions in a flexible and efficient manner, relative to traditional techniques. It is also now recognized that it may be desirable to enhance the immersive experience of guests for such attractions, and to provide a more personalized or customized experience for guests.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an augmented reality (AR) and 3-dimensional (3-D) viewing system for providing an AR and 3-D experience to a user includes a wearable visualization device having a viewing assembly through which the user is capable of viewing a real-world environment. The viewing assembly includes a first display configured to display one or more AR features and a 3-D viewing component that enables the user to perceive one or more coded 2-dimensional (2-D) images as one or more deciphered 3-D features. The AR and 3-D viewing system also includes a fixed 3-D display system having a second display configured to display the one or more coded 2-D images. The fixed 3-D display system is disposed within the real-world environment.

In one embodiment, a wearable visualization device for providing an augmented reality (AR) and 3-dimensional (3-D) experience to a user includes a viewing assembly through which the user is capable of viewing a real-world environment. The viewing assembly includes a first display configured to display one or more AR features. The viewing assembly also includes a 3-D processing assembly having a first 3-D filtering layer for a first eye portion of the first display and a second 3-D filtering layer for a second eye portion of the first display. The first 3-D filtering layer and the second 3-D filtering layer cooperate to enable the user to perceive one or more coded 2-dimensional (2-D) images displayed on a second display as one or more deciphered 3-D features, wherein the second display is separate from the wearable visualization device.

In one embodiment, an augmented reality (AR) and 3-dimensional (3-D) viewing system for providing an AR and 3-D experience to a user includes a wearable visualization device having a viewing assembly through which the user is capable of viewing a real-world environment. The viewing assembly includes a first display configured to display one or more AR features within a first focal plane. The viewing assembly also includes a 3-D viewing component that enables the user to perceive one or more coded 2-dimensional (2-D) images as one or more deciphered 3-D features within a second focal plane. The first focal plane and the second focal plane are independent of one another. The augmented reality (AR) and 3-D viewing system also includes a 3-D display system having a second display configured to display the one or more coded 2-D images. The 3-D display system is disposed within the real-world environment.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems of providing an augmented reality (AR) and 3-dimensional (3-D) experience as part of an attraction associated with an amusement park or theme park. With the integration of head wearable technologies on certain ride vehicles within theme park environments, it becomes difficult or unrealistic for users to simultaneously wear traditional 3-D glasses to perceive 3-D content displayed or projected within the theme park environments. However, the 3-D content provided by 3-D display systems, including projectors or electronic display devices, may still be useful in contributing to a user's experience within the theme park environments. As such, embodiments of an AR and 3-D viewing system disclosed herein integrate reflective AR technologies with 3-D viewing technologies within a single headset to allow users to perceive both near-eye AR content, presented by the headset, and far-eye 3-D content, presented by a 3-D display system. As utilized herein, AR includes any suitable techniques to display virtual features that augment or modify a user's view of a surrounding environment. For example, AR features may be provided by projecting slightly offset images onto a wearable display in front of the user (or into the eyes of the user), such that the user optically combines the two offset images into the AR features. Further, reference to 3-D includes any suitable stereoscopic techniques to provide a stereoscopic 3-D effect that enables a user to perceive depth from two-dimensional (2-D), slightly offset images, or 2-D coded images, that are presented to each eye of the user. The 3-D features are visualized from an electronic display device or a projector screen via light-filtering coatings or elements that enable each eye of the user to receive two different images of a same object, which are optically combined into a discernable or deciphered 3-D appearance.

For example, present embodiments may include viewing devices such as wearable visualization devices (e.g., electronic goggles, displays, eyeglasses) through which users may view fixed visualization devices (e.g., electronic display screens, projector screens), which operate in concert to provide an AR and 3-D experience to a user. The wearable visualization device includes components therein having optical properties that enable users to perceive both AR features presented on a wearable display of the wearable visualization device and 3-D features presented on a separate display of the fixed visualization devices, which are part of a 3-D display system. The 3-D display system may include a projector that presents coded content onto the separate display to allow the user to visually decode or process the coded content as 3-dimensional through 3-D viewing components of the wearable visualization device. As discussed herein, the wearable visualization device may employ any suitable 3-D technology for enabling the user to perceive the 3-D features, including a passive 3-D lens, coating, or filter (e.g., anaglyph, polarization, etc.) or an active 3-D lens, coating, or filter (e.g., active shuttering system). The 3-D display system and wearable visualization device may be configured to operate independently, or may be operatively coupled through a controller (e.g., master controller, computer graphics generation system, one or more processors), which may synchronize and/or coordinate the visualizations displayed by the 3-D display system and the wearable visualization device.

By enabling the 3-D features to be perceived in an environment disposed beyond the wearable visualization device, and in combination with the AR features, the wearable visualization device allows the user to perceive content in multiple, independent focal planes. In some cases, the multi-dimensional content of the presently disclosed wearable visualization device provides a more immersive experience or theme than a single focal plane provided by traditional wearable visualization devices. As such, provision of multiple focal planes generally provides a more realistic, personalized entertainment experience to the users of the AR and 3-D viewing system. Moreover, although discussed herein with reference to employing the wearable visualization device within a theme park, the disclosed techniques may be applied to any suitable AR device for any suitable application. For example, the AR and 3-D viewing system including the wearable visualization device may be used to provide 3-D and AR experiences to users at home (e.g., playing a videogame), at a workplace (e.g., constructing models, viewing immersive presentations), and so forth.

Figure 1:
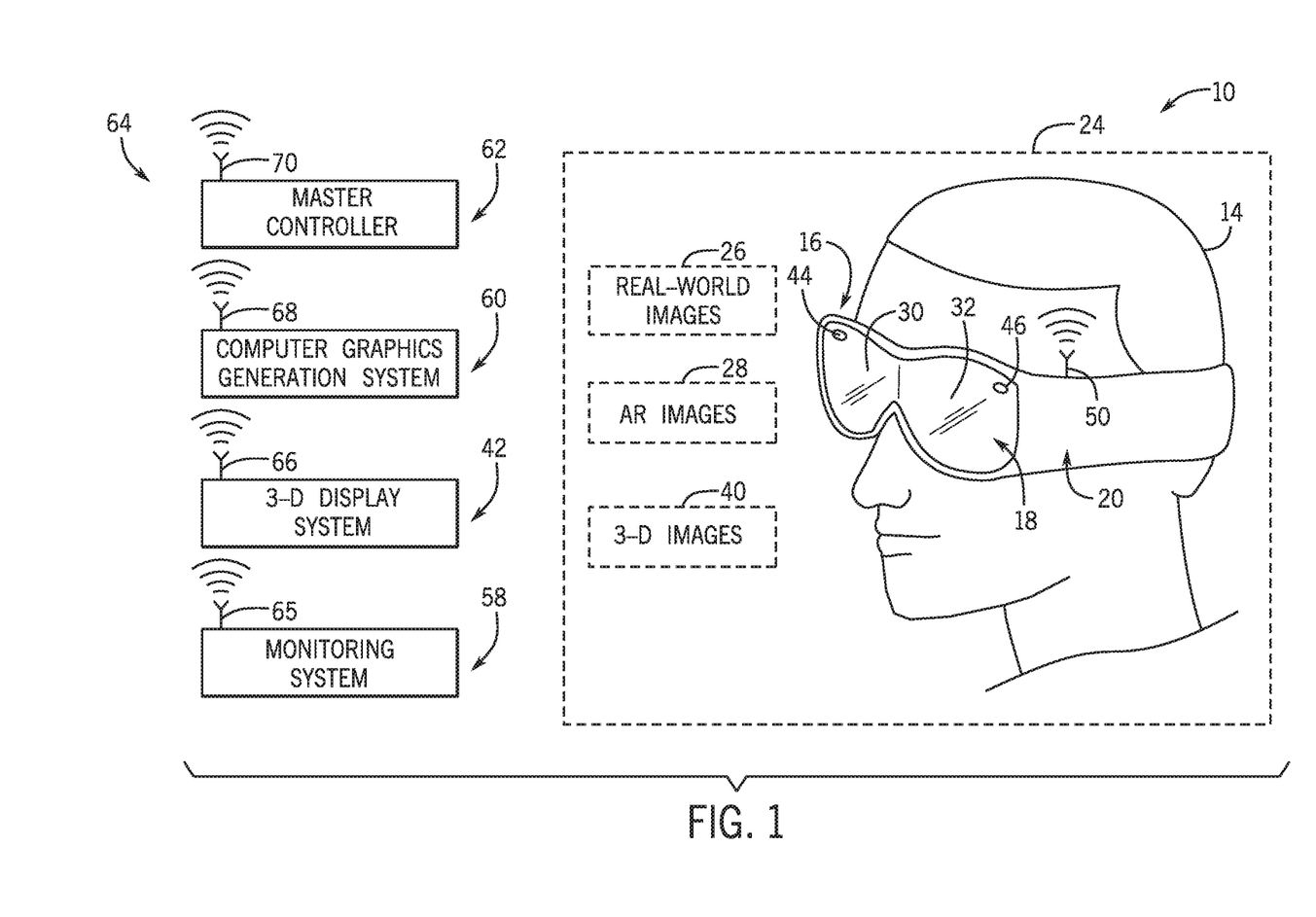
FIG. 1 is an illustration of an embodiment of a wearable visualization device that may be used in an augmented reality (AR) and 3-dimensional (3-D) viewing system, in accordance with present embodiments.

Turning now to the drawings, FIG. 1 depicts an embodiment of an AR and 3-D viewing system 10 that enables a user 14 to experience (e.g., view, interact with) AR and 3-D images or features overlaid onto a real-world environment. In accordance with certain embodiments, the user 14 may purchase or otherwise be provided a wearable visualization device 16 having a viewing assembly 18, which may, in certain embodiments, include electronic eyeglasses (e.g., AR/virtual reality eyeglasses, goggles). The wearable visualization device 16 may include a wearable portion 20, illustrated in the present embodiment as a headband, to house at least a portion of the viewing assembly 18 and retain the viewing assembly 18 in position in front of eyes of the user 14.

The wearable visualization device 16 may be used in combination with other features of the AR and 3-D viewing system 10 to create perception of a surreal environment 24 for the user 14. Through the wearable visualization device 16, the user 14 may view real-world images 26, which each generally represents features of the physical or real-world environment that the user 14 would see in real-time, even when not wearing the wearable visualization device 16. The term "real-time" indicates that the images are obtained and/or provided to the user 14 in a timeframe within or substantially close (e.g., ±0.01 second, ±0.1 second, ±1 second) to the time of actual observation by the user 14. As discussed herein, the viewing assembly 18 of the wearable visualization device 16 partially controls the view of the user 14 (e.g., using a transflective or semi-transparent display), such that the surreal environment 24 includes the real-world images 26 of the physical environment electronically merged with one or more AR images 28 (e.g., including one or more AR features, virtual augmentations). That is, the surreal environment 24 includes the actual physical environment with the AR images 28 overlaid onto the viewing assembly 18 of the wearable visualization device 16 in the present embodiment. In other embodiments, the AR images 28 may be projected directly onto the eyes of the user 14.

As further illustrated, the viewing assembly 18 of the wearable visualization device 16 includes a first display portion 30 and a second display portion 32, each respectively corresponding to one eye of the user 14. In other embodiments, a unified display that corresponds to both eyes of the user 14 may be employed within the wearable visualization device 16. The respective display portions 30, 32 may each include, by way of non-limiting example, wholly or partially transparent lenses onto which the AR images 28 may be overlaid. In one embodiment, the display portions 30, 32 are display surfaces and the wearable visualization device 16 includes features (e.g., circuitry, light emitters) located adjacent to their respective peripheries to overlay the AR images 28 thereon. Additionally or alternatively, the display portions 30, 32 may include any suitable transflective, transparent, or translucent material useful in displaying the real-world images 26 and the AR images 28 to the user 14. In one embodiment, the respective display portions 30, 32 may each include a transparent (e.g., see-through) LED display or a transparent (e.g., see-through) OLED display useful in allowing, for example, the user 14 to view the AR images 28 appearing on the respective display portions 30, 32 as an overlay to the actual and physical environment (e.g., an attraction associated with an amusement park or an interior of a passenger ride vehicle).

Moreover, through the viewing assembly 18 of the wearable visualization device 16, the user 14 may view 3-D images 40 (e.g., including one or more 3-D features), which contribute to the surreal environment 24 experienced by the user 14. The 3-D images 40 are presented on a 3-D display of a 3-D display system 42 located within the physical environment, physically separate or independent from the wearable visualization device 16. As such, the user 14 may simultaneously visualize the AR images 28 within a first focal plane defined by the wearable visualization device 16 and the 3-D images 40 within a second focal plane defined by the separate 3-D display. To enable the user 14 to visually process the AR images 28 and 3-D images 40 simultaneously, the viewing assembly 18 includes a 3-D viewing component operatively coupled within the viewing assembly 18. As discussed in more detail with reference to FIGS. 2 and 3, the 3-D viewing component includes a 3-D viewing component portion adapted for each eye of the user 14 to enable the user 14 to perceive the 3-D images 40 presented by the 3-D display system 42. That is, a first 3-D viewing component portion may be associated with one display portion 30, 32 and a second 3-D viewing component portion may be associated with the other display portion 30, 32. As described in more detail below, the 3-D images 40 are provided to the user 14 through the wearable visualization device 16 in any suitable passive or active 3-D format, such that the 3-D viewing component of the viewing assembly 18 includes one or multiple anaglyph filters, polarization filters, liquid crystal layers, or so forth.

Cameras 44 and 46 are included in the present embodiment of the wearable visualization device 16 to capture real-time video data (e.g., live video) or ambient light signals of the physical environment that respectively correspond to the point of view of the user 14. In other embodiments, a single camera may be employed by the wearable visualization device 16. The wearable visualization device 16 may also include additional cameras to track eye movements of the user in some embodiments, which may be particularly useful for embodiments where virtual features are projected directly into the eyes of the user 14.

Communication features 50 (e.g., including a wireless transceiver) of the wearable visualization device 16 may transmit real-time data (e.g., video data, eye tracking data) captured via the respective cameras 44, 46 to other components of the wearable visualization device 16 or systems coupled thereto for processing, in some embodiments. Other features of the wearable visualization device 16 may transmit orientation data, position data, point of view data (e.g., focal length, orientation, pose), motion tracking data, and so forth obtained and/or derived based on data obtained via sensors of the wearable visualization device 16. Such sensors may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), and others. In certain embodiments, features of the wearable visualization device 16 (e.g., geometric aspects or markings) may be monitored by a monitoring system 58 (e.g., one or more cameras) to determine position, location, orientation, and so forth of the wearable visualization device 16 and in turn, that of the user 14. The monitoring system 58 may be communicatively coupled to the computer graphics generation system 60 and used to identify position, location, orientation, and so forth of the user 14 (or multiple users).

As depicted, via the communication features 50 of the wearable visualization device 16, the wearable visualization device 16 is communicatively coupled to the 3-D display system 42, the monitoring system 58, a computer graphics generation system 60, and a master controller 62 along a wireless network 64. The wireless network 64 may include a wireless local area network (WLAN), a wireless wide area network (WWAN), a near field communication (NFC), a mesh-type network, and so forth. Indeed, in embodiments of the wireless network 64 having the mesh-type network, the various displayable content discussed herein may be reflexively or automatically localized for a current state or condition of the AR and 3-D viewing system 10 and/or the users 14. In the present embodiment, the wireless network 64 communicatively couples each component of the AR and 3-D viewing system 10, though in other embodiments, one or multiple components of the AR and 3-D viewing system 10 may be communicatively coupled by a wired connection. Accordingly, the monitoring system 58, the 3-D display system 42, the computer graphics generation system 60, and the master controller 62 each include respective communication features 65, 66, 68, 70 that enable the 3-D display system 42, the monitoring system 58, the computer graphics generation system 60, and the master controller 62 to transfer data and/or control signals with the wearable visualization device 16 via the wireless network 64.

Looking now to more details of the components communicatively coupled to the wearable visualization device 16, the computer graphics generation system 60 of the AR and 3-D viewing system 10 is responsible for generating the AR images 28 to be presented to the user 14 via the wearable visualization device 16. For example, the computer graphics generation system 60 of the present embodiment is a server or game controller that is positioned within an amusement park to generate the AR images 28 based on various factors associated with the user 14. As such, the computer graphics generation system 60 is generally a system having significant processing power that renders the AR images 28 based on specific inputs received via the wireless network 64. For example, in some embodiments, the computer graphics generation system 60 processes the real-time video data (e.g., live video), orientation and position data, point of view data, or any combination thereof, received from the wearable visualization device 16 and/or the monitoring system 58.

Specifically, the computer graphics generation system 60 may use this data to generate a frame of reference to register the AR images 28 to the physical environment, for example, to the real-world images 26 viewable by the user through the wearable visualization device 16. Using the frame of reference generated based on the orientation data, position data, point of view data, motion tracking data, and so forth, the computer graphics generation system 60 may then render a view of the AR images 28 in a manner that is temporally and spatially commensurate with what the user 14 would perceive if not wearing the wearable visualization device 16. The computer graphics generation system 60 may constantly update (e.g., in real-time) the rendering of the AR images 28 to reflect change in respective orientation, position, and/or motion of the respective user 14.

In certain embodiments, the computer graphics generation system 60 is positioned within a passenger ride vehicle. The computer graphics generation system 60 may track data corresponding to a plurality of users 14 (e.g., passengers of the passenger ride vehicle), where each user 14 (or at least some users 14) has a corresponding wearable visualization device 16. In some embodiments, the computer graphics generation system 60 generates the AR images 28 for display via each wearable visualization device 16 within the passenger ride vehicle. After or during generation of the AR images 28, the computer graphics generation system 60 provides the AR images 28 (e.g., data indicative of the AR images 28) to the wearable visualization devices 16 in real-time for display on the viewing assemblies 18 thereof. In other embodiments, the computer graphics generation system 60 may be included with the wearable visualization device 16, combined with the master controller 62, and so forth.

Moreover, the 3-D display system 42 of the AR and 3-D viewing system 10 is responsible for displaying the 3-D images 40 to contribute to the surreal environment 24 experienced by the user 14. In some embodiments, the 3-D images 40 are retrieved from a memory of the 3-D display system 42, though in other embodiments, the computer graphics generation system 60 is shared by both the wearable visualization devices 16 and the 3-D display system 42, such that the computer graphics generation system 60 generates the 3-D images 40 and transmits the 3-D images 40 (e.g., data indicative of the 3-D images 40) to the 3-D display system 42. Additionally, in some embodiments, the 3-D display system 42 includes its own computer graphics generation system 60 for generating the 3-D images 40. As discussed in more detail below, the 3-D display system 42 includes a separate, fixed display, such as a projector screen or an electronic display device, on which coded 2-dimenstional (2-D) images are presented to the user 14. As noted herein, coded 2-D images include any suitable flat depictions of objects from which depth may be perceived via any suitable 3-D viewing technology. For example, the coded 2-D images may include flat, offset perspectives of one or multiple objects, which when viewed through a stereoscopic or deciphering device or component, give the one or multiple objects an illusion of depth. When viewed without the deciphering device or component, the coded 2-D images may be generally blurry or undiscernible. Thus, by viewing the coded 2-D images through the viewing assembly 18 of the wearable visualization device 16, the user 14 visually deciphers the coded 2-D images as three-dimensional, revealing the 3-D images 40. It is to be understood that although the present embodiments may be described with reference to presenting or displaying the 3-D images 40 to the user 14 for brevity, the images presented to the user 14 generally include these 2-D depictions from which depth is perceived via the wearable visualization device 16. Indeed, as discussed in more detail herein, the 3-D images 40 are perceived in combination with the AR images 28 as an overlay to the real-world images 26, thus providing an enhanced viewing experience to the user 14.

The master controller 62 (e.g., show controller) of the present embodiment of the AR and 3-D viewing system 10 coordinates operation of the components of the AR and 3-D viewing system 10 disclosed herein. For example, the master controller 62 provides control signals via the wireless network 64 to the computer graphics generation system 60, the 3-D display system 42, and the wearable visualization device 16. Generally, the master controller 62 of the present embodiment instructs the computer graphics generation system 60 to generate and provide the AR images 28 to the wearable visualization device 16. In some embodiments, the master controller 62 instructs the computer graphics generation system 60 to generate and provide the 3-D images 40 to the 3-D display system 42. Moreover, the master controller 62 instructs the wearable visualization device 16 to present the AR images 28 to the user 14 and instructs the 3-D display system 42 to present the 3-D images 40 to the user 14, each in a controlled, contextualized, and/or individualized manner. Example embodiments of the AR and 3-D viewing system 10 are discussed below with reference to FIGS. 2 and 3.

Figure 2:
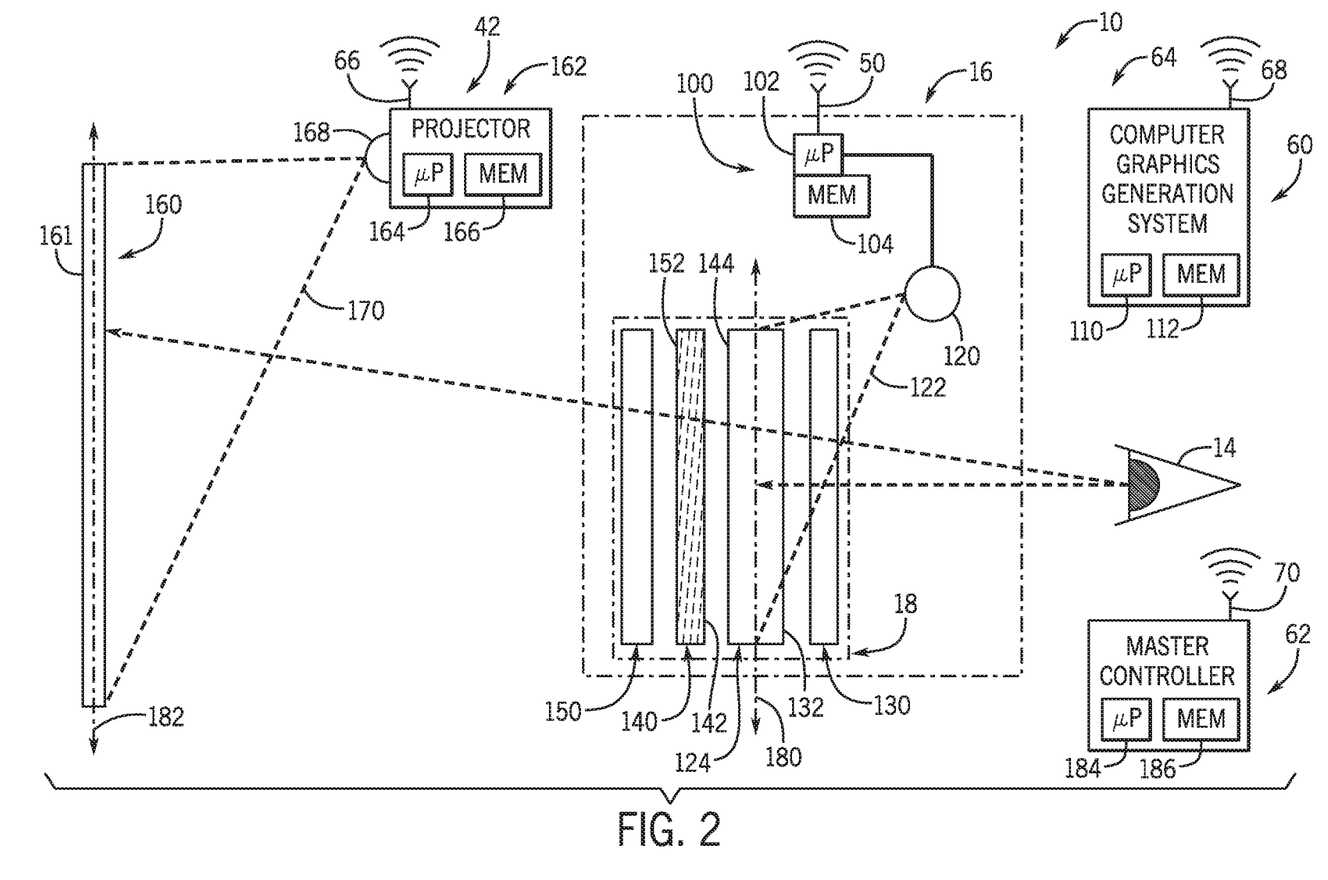
FIG. 2 is a partially exploded schematic view of an embodiment of the wearable visualization device within the AR and 3-D viewing system of FIG. 1, in accordance with present embodiments.

FIG. 2 illustrates a partially-exploded schematic view of an embodiment of the wearable visualization device 16 within the AR and 3-D viewing system 10. As illustrated, the wearable visualization device 16 includes the viewing assembly 18 to allow the user 14 to simultaneously view the AR images 28 presented by the wearable visualization device 16 and the 3-D images 40 presented by the 3-D display system 42. When wearing the wearable visualization device 16, the viewing assembly 18 is retained in front of the eyes of the user 14, with the first display portion 30 in front of a first eye of the user 14 and the second display portion 32 in front of a second eye of the user 14. The display portions 30, 32 are not separately illustrated in FIG. 2.

To enable better understanding of the components of the viewing assembly 18, details are first provided herein regarding the operation of components of the wearable visualization device 16 that operate to project the AR images 28 onto the viewing assembly 18. That is, the wearable visualization device 16 includes certain electronic components to facilitate display of the AR images 28 via the viewing assembly 18. For example, in the illustrated embodiment, the wearable visualization device 16 includes processing circuitry 100, such as a processor 102 and a memory 104. The processor 102 is operatively coupled to the memory 104 to execute instructions for carrying out the presently disclosed techniques, for example, presenting or rendering the AR images 28 (e.g., virtual features or images). In some embodiments, these instructions are encoded in programs or code stored in a tangible non-transitory computer-readable medium, such as the memory 104 and/or other storage. The processor 102 may be a general-purpose processor, system-on-chip (SoC) device, an application-specific integrated circuit (ASIC), or some other similar processor configuration.

Additionally, the communication features 50 of the wearable visualization device 16 are operatively coupled to the processor 102 to enable the wearable visualization device 16 to communicate with the computer graphics generation system 60, the master controller 62, and/or the 3-D display system 42 via the wireless network 64. For example, the computer graphics generation system 60 of the present embodiment includes a processor 110 (e.g., general purpose processor or other processor) and a memory 112, both operatively coupled to the communication features 68. Because the computer graphics generation system 60 generally includes a greater amount of processing power than the wearable visualization device 16, the computer graphics generation system 60 is capable of generating the AR images 28 for display via the wearable visualization device 16, as well as transmitting the AR images 28 to the wearable visualization device 16 via the wireless network 64. In embodiments having multiple wearable visualization devices 16, the computer graphics generation system 60 may provide the AR images 28 for each wearable visualization device 16.

Moreover, the processor 102 of the wearable visualization device 16 is operatively coupled to a microprojector 120 (e.g., light source, OLED display device) that generates and projects light 122, which is indicative of the AR images 28, onto the viewing assembly 18 of the wearable visualization device 16. It is to be understood that the wearable visualization device 16 may include one microprojector for each eye of the user 14 in some embodiments. To receive and redirect the light 122 from the microprojector 120 into the eyes of the user 14, who visualizes the AR images 28 therefrom, the viewing assembly 18 of the wearable visualization device 16 includes a wearable display 124 (e.g., first display, near field display). Although illustrated as flat or rectangular components, it is to be understood that the wearable display 124 and other components of the viewing assembly 18 may include any suitable curvature to direct the light 122 into the eyes of the user 14. As introduced above with reference to the display portions 30, 32, the wearable display 124 is a transflective (e.g., partially translucent, partially reflective) component that is sufficiently transparent to enable ambient light emitted from the physical environment, including light representative of the 3-D images 40 discussed below, to reach the eyes of the user 14. To further enhance the reflective properties of the viewing assembly 18, a semi-reflective coating 130 or film is disposed within the viewing assembly 18 of the present embodiment. More specifically, the semi-reflective coating 130 is positioned between a user-facing surface 132 of the wearable display 124 and the user 14 in the present embodiment. The semi-reflective coating 130 may be any suitable material that enables the user 14 to perceive the AR images 28 projected on the wearable display 124 by the microprojector 120.

With respect to the 3-D viewing capability of the wearable visualization device 16, the wearable visualization device 16 includes a 3-D viewing component 140 to allow the user to perceive the 3-D images 40. For example, in the present embodiment, the 3-D viewing component 140 of the viewing assembly 18 includes a passive 3-D lens 142 that optically decodes the 3-D images 40 presented to the user 14. The passive 3-D lens 142 is a coating applied to the wearable display 124 or a flexible film retained adjacent to the wearable display 124, in some embodiments. Additionally, although illustrated as disposed adjacent to an environment-facing surface 144 of the wearable display 124, it is to be understood that the 3-D viewing component 140 may be positioned in any other suitable arrangement within the viewing assembly 18.

Generally, the 3-D viewing component 140 includes a first filter for the first display portion 30 of the viewing assembly 18 and a second filter, including different optical properties or qualities, for the second display portion 32 of the viewing assembly 18. For example, in some embodiments, the 3-D viewing component 140 is a light-filtering lens assembly or 3-D filtering layer that includes a first anaglyph lens or filter (e.g., blue film) for the first display portion 30 and a second anaglyph lens or filter (e.g., red film) for the second display portion 32. In other embodiments, the 3-D viewing component 140 is a light-filtering lens assembly or 3-D filtering layer that includes a first polarized lens having a first polarization (e.g., clockwise, vertical) for the first display portion 30 and a second polarized lens having a second, opposite polarization (e.g., counter-clockwise, horizontal) for the second display portion 32. The 3-D viewing component 140 therefore utilizes wavelength filtering or polarization filtering to condition the 3-D images 40 for viewing by the user 14. As such, when wearing the wearable visualization device 16, the 3-D viewing component 140 provides a first perspective or portion of the 3-D images 40 to one eye of the user 14, and a second, offset perspective or portion of the 3-D images 40 to the other eye of the user 14. The relatively offset images provide a perception of depth to the user 14, who visualizes the 3-D images 40 at a specified focal length that varies based on a magnitude of the offset between the offset images.

The viewing assembly 18 may also include an anti-glare coating 150 or filter disposed adjacent to an environment-facing surface 152 of the 3-D viewing component 140. The anti-glare coating 150 is any suitable semi-opaque or light-blocking material that reduces the transmission of light from strong light sources through the viewing assembly 18 that would otherwise obscure the AR images 28 and the 3-D images 40. In other embodiments, the anti-glare coating 150 is omitted and/or a hat brim is worn by the user 14 to reduce glare onto the viewing assembly 18. Moreover, it is to be understood that the coatings of the viewing assembly 18 may be disposed in any suitable order relative to one another, provided that the viewing assembly 18 is sufficiently transparent to the light from the 3-D display system 42 discussed herein to enable the user 14 to properly visualize the 3-D images 40, and sufficiently reflective to the light 122 from the microprojector 120 to enable the user 14 to properly visualize the AR images 28.

When the user 14 is facing the 3-D display system 42, the 3-D display system 42 directs light indicative of the 3-D images 40 to the viewing assembly 18. To present the 3-D images 40 to the user 14, the 3-D display system 42 includes a fixed display 160 (e.g., second display, remote display), which is separate from the wearable visualization device 16. In the present embodiment, the fixed display 160 is a projector screen 161 or a wall or projection surface, onto which a projector 162 (e.g., 3-D projector) of the 3-D display system 42 overlays the 3-D images 40. The projector 162 includes a processor 164, a memory 166, a light emitting device 168, and the communication features 66, which are operatively coupled to the processor 164 and communicatively coupled to the wireless network 64. The light emitting device 168 is any suitable system of lenses, light sources, and/or lasers that selectively directs light 170 representative of the 3-D images 40 onto the fixed display 160 in response to instructions provided by the processor 164. Indeed, as discussed herein, the light emitting device 168 may include a multiplexing lens or any other suitable multiplexing components capable of displaying individualized 3-D content for multiple users 14. Additionally, the processor 164 retrieves data indicative of the 3-D images 40 from the memory 166, and instructs the light emitting device 168 to generate the light 170 representative of the 3-D images 40. In other embodiments, the light emitting device 168 may receive data indicative of the 3-D images 40 from the computer graphics generation system 60, from a storage component disposed within an input/output device of the projector 162, and so forth.

Although the 3-D display system 42 is discussed herein with reference to the fixed display 160 that is stationary within the real-world environment, it is to be understood that the fixed display 160 and/or the projector 162 may be moveable in some embodiments. For example, the fixed display 160 and/or the projector 162 may be attached to a passenger ride vehicle, moveable along tracks, or otherwise adjustable in position by any suitable actuator. In such embodiments, the actuator may receive control signals to coordinate movement of the fixed display 160 and/or the projector 162 from the master controller 62.

As coordinated by the master controller 62, during operation of the AR and 3-D viewing system 10, the AR images 28 are displayed within a first focal plane 180 associated with the wearable display 124, and the 3-D images 40 are displayed within a second focal plane 182 associated with the fixed display 160. That is, the master controller 62 includes a processor 184, a memory 186, and the communication features 70 to provide timing signals or control signals to the wearable visualization device 16 and the 3-D display system 42. Based on the timing signals, the wearable visualization device 16 and the 3-D display system 42 respectively generate the AR images 28 and the 3-D images 40 for the user 14 to visualize simultaneously. Because the fixed display 160 is positioned within the real-world environment, and the wearable display 124 is employed by and moved by movements of the user 14, the first focal plane 180 and the second focal plane 182 are independent from one another. That is, the positioning of one focal plane 180, 182 does not affect the positioning of the other focal plane 180, 182, such that the focal planes 180, 182 are different from one another in the illustrated embodiment. The user 14 may therefore visualize content in multiple focal planes to enjoy a more realistic viewing experience of virtual content than the experience provided by using a traditional wearable visualization device.

Figure 3:
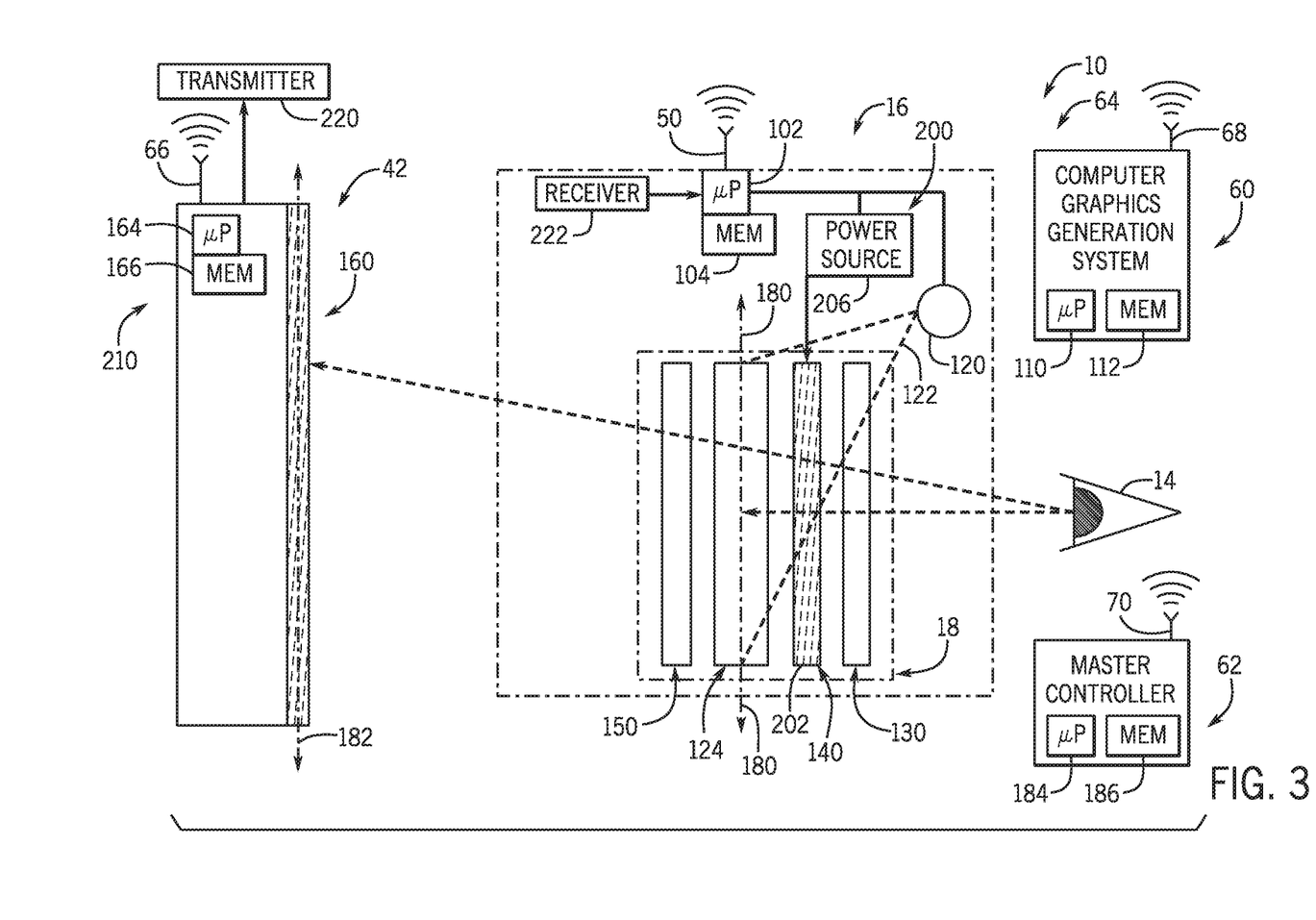
FIG. 3 is a partially exploded schematic view of another embodiment of the wearable visualization device within the AR and 3-D viewing system of FIG. 1, in accordance with present embodiments.

FIG. 3 illustrates a partially-exploded schematic view of another embodiment of the wearable visualization device 16 employed within the AR and 3-D viewing system 10. Through the viewing assembly 18, the wearable visualization device 16 allows the user 14 to view the AR images 28 presented on the wearable display 124 and the 3-D images 40 presented by the 3-D display system 42, in a manner substantially similar to the operation of the wearable visualization device 16 of FIG. 2. However, in place of the passive 3-D lens 142 of the wearable visualization device 16 of FIG. 2, the 3-D viewing component 140 of the present embodiment is an active shuttering system 200 (e.g., having active shuttering lenses). Generally, compared to a passive 3-D system, the active shuttering system 200 provides an additional layer of customizability, or a control handle, for adjusting and customizing the 3-D images 40 displayed for the user 14. That is, the active shuttering system 200 of the present embodiment is controllable by the wearable visualization device 16 to provide more control over and customization to the 3-D images 40 viewed by the user 14, as discussed herein.

More particularly, the active shuttering system 200 of the present embodiment includes a liquid crystal layer 202 (e.g., multiplexing coating or capability) disposed within the viewing assembly 18. As illustrated, the liquid crystal layer 202 is positioned between the wearable display 124 and the semi-reflective coating 130. In other embodiments, the liquid crystal layer 202 may be arranged in any other suitable position within the viewing assembly 18 that does not hinder operation of the semi-reflective coating 130, the wearable display 124, and/or the anti-glare coating 150 of the viewing assembly 18. For example, the liquid crystal layer 202 is positioned between the wearable display 124 and the anti-glare coating 150 in some embodiments.

The liquid crystal layer 202 is a controllable element having optical properties that adjust in response to control signals (e.g., voltage source, power source) output by the processor 102 of the wearable visualization device 16. Moreover, the liquid crystal layer 202 of the present embodiment is partitioned between a first liquid crystal layer portion for the first display portion 30 of the wearable visualization device 16 and a second liquid crystal layer portion for the second display portion 32 of the wearable visualization device 16. That is, based on application of the control signals, each liquid crystal layer portion of the liquid crystal layer 202 adjusts between an opaque state and a translucent state. As such, in response to receiving the control signals provided to the liquid crystal layer portions of the liquid crystal layer 202, the viewing assembly 18 is capable of shuttering open (e.g., making transparent) one display portion 30, 32, and shuttering closed (e.g., making opaque) the other display portion 30, 32. As such, the liquid crystal layer 202 of the active shuttering system 200 is a 3-D filtering layer that filters light viewable to the user 14 based on a time at which the light is emitted, instead of based on an orientation or a wavelength of the light.

In other embodiments, the liquid crystal layer 202 may be opaque when a control signal is not provided by the processor 102, and becomes transparent in response to application or receipt of the control signal. In some embodiments, the liquid crystal layer portions have opposite state orientations, such that application of the control signal to the liquid crystal layer 202 turns a first liquid crystal layer opaque while a second liquid crystal layer turns transparent, and that disapplication of the control signal turns the second liquid crystal layer opaque while the first liquid crystal layer portion turns translucent. In these embodiments, reliance on a single control signal to modify both liquid crystal layer portions may provide reduced opportunities for the active shuttering system 200 to become out of sync.

In the illustrated embodiment, the wearable visualization device 16 further includes a power source 206 that is operatively coupled between the processor 102 and the liquid crystal layer 202. As such, the processor 102 provides control signals to control operation of the power source 206, which selectively provides control signals to the liquid crystal layer 202. In some embodiments, the power source 206 is the same power source 206 that provides energy to other components of the wearable visualization device 16, such as the microprojector 120. In response to the control signals provided by the power source 206, the optical properties of the liquid crystal layer portions of the liquid crystal layer 202 are selectively adjusted. In other embodiments, the processor 102 provides control signals to the liquid crystal layer 202 directly, without dependence on the power source 206.

During operation of the AR and 3-D display system 42, the active shuttering system 200 shutters the liquid crystal layer portions of the liquid crystal layer 202 while the 3-D display system 42 alternates the 3-D images 40 presented on the fixed display 160, such as via any suitable multiplexing components and/or processes. That is, the 3-D images 40 presented by the 3-D display system 42 rapidly vary between relatively offset images, in coordination with shuttering of the active shuttering system 200. As such, the left and right eyes of the user 14 each receive respective perspectives of images from the 3-D display system 42 that are offset from one another. The user 14 is therefore able to perceive depth from the different perspectives of the 3-D images 40, revealing the 3-D images as three-dimensional. In some embodiments, the 3-D display system 42 and the active shuttering system 200 shutter or change the images at a 60 hertz, 100 hertz, 120 hertz, or any sufficiently high refresh rate (e.g., buffer updates per second) that allows the user 14 to view the 3-D images 40 in a real-time, realistic, or life-like manner. As discussed above, the 3-D images 40 are viewed in combination with the AR images 28 presented on the wearable display 124.

To display the 3-D images 40 to the user 14 via the active shuttering system 200, the AR and 3-D viewing system 10 includes an embodiment of the 3-D display system 42 having an electronic display device 210 (e.g., television screen) as the fixed display 160. The electronic display device 210 of the present embodiment includes the processor 164 operatively coupled to the memory 166 and the communication features 66, as discussed above with reference to the projector 162 of FIG. 2. Similar to the projector 162, the electronic display device 210 may also include any suitable multiplexer device and/or demultiplexer device to enable a multiplexed signal to be split into multiple signals that are individually presented to multiple users 14. The communication features 66 are any suitable transceiver or antenna that enables the electronic display device 210 to communicate with the computer graphics generation system 60, the master controller 62, and the wearable visualization device 16 through the wireless network 64. The fixed display 160 of the electronic display device 210 displays the 3-D images 40 based on data stored within the memory 166 of the electronic display device 210. However, in other embodiments, the 3-D images 40 are generated by the computer graphics generation system 60 and transmitted to the electronic display device 210 through the wireless network 64 as a real-time data stream. The fixed display 160 of the electronic display device 210 therefore presents offset images of the 3-D images 40 to the user 14 in an alternating manner that enables the user 14 to perceive the 3-D images 40 through the wearable visualization device 16.

The electronic display device 210 of the 3-D display system 42 also includes a transmitter 220 (e.g., infrared [IR] transmitter) that transmits shuttering signals such as IR signals, synchronization signals, or timing signals to a receiver 222 (e.g., IR receiver) of the wearable visualization device 16. Based on the shuttering signals from the transmitter 220, the wearable visualization device 16 coordinates or aligns the shuttering of the liquid crystal layer portions of the liquid crystal layer 202 for each display portion 30, 32 of the wearable visualization device 16 with the switching of the offset images of the 3-D images 40. The wearable visualization device 16 and the fixed display 160 may therefore use feedforward and/or feedback to control to operate in coordination with one another, at substantially the same refresh rate (e.g., within 5%).

As recognized herein, operation of the 3-D display system 42 at higher refresh rates gives more realistic views of the 3-D images 40 presented in combination with the AR images 28. Moreover, if operating at a sufficiently high refresh rate, use of the active shuttering system 200 as the 3-D viewing component 140 enables the AR and 3-D viewing system 10 to individualize the content presented on the fixed display 160 for each user 14 or for each group of users 14 viewing the fixed display 160 through the wearable visualization device 16, as discussed in more detail below. Generally, individualized content may be presented for a number of groups that is equal to the refresh rate of the 3-D display system divided by 60 hertz, or another suitable refresh rate threshold, such that each group receives content at or above the refresh rate threshold.

Figure 4:
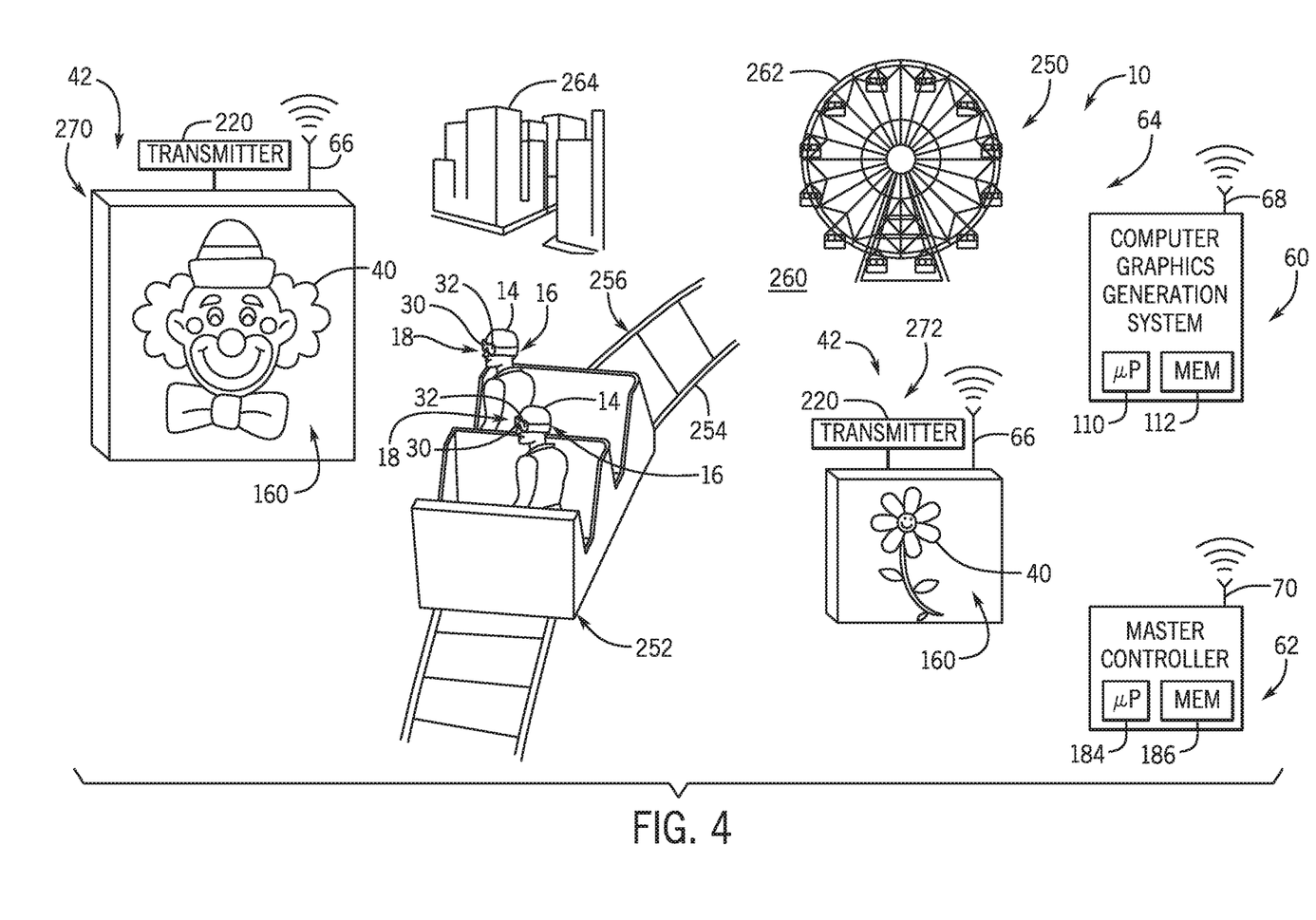
FIG. 4 is an illustration of a 3-D display system and the wearable visualization device of the AR and 3-D viewing system of FIG. 1, which may be used from a passenger ride vehicle, in accordance with present embodiments.

By way of an example of the AR and 3-D viewing system 10 for providing 3-D content to multiple users 14, FIG. 4 illustrates two users 14 that are each wearing one of the wearable visualization devices 16, described with reference to FIG. 3, within an amusement park 250. As discussed above, each of the wearable visualization devices 16 includes one of the wearable displays 124 (e.g., first display, third display) and one of the 3-D viewing components 140 discussed above. As such, one of the wearable visualization devices 16 includes a first 3-D viewing component 140 and the other of the wearable visualization devices 16 includes a second 3-D viewing component 140. The users 14 are in a passenger ride vehicle 252 that is moveable along a ride path 254 (e.g., tracks) of a thrill ride 256, such as a rollercoaster or dark ride. In the illustrated embodiment, the ride path 254 is provided through a surrounding physical environment 260 within view of additional amusement attractions 262 (e.g., Ferris wheel), a mall of park facilities 264 (e.g., game areas, hotels, restaurants, souvenir shops), and other elements of the physical environment 260.

The 3-D display system 42 includes a first electronic display device 270 and a second electronic display device 272 disposed within the physical environment 260 and viewable from the ride path 254. By including multiple electronic display devices 270, 272, the AR and 3-D viewing system 10 enables the users 14 to perceive the 3-D images 40 throughout a partial or full duration of the thrill ride 256. The electronic display devices 270, 272 of the 3-D display system 42 are fixed or unmoving in the present embodiment, such that the passenger ride vehicle 252 is moveable along the ride path 254 past the fixed displays 160 (e.g., second displays) of the electronic display devices 270, 272. In other embodiments, the electronic display devices 270, 272 may be moveable, while the passenger ride vehicle 252 is stationary. Additionally, it is to be understood that in some embodiments, the projector screen 161 and the projector 162 may be employed in addition to or as an alternative to the electronic display devices 270, 272 to present the 3-D images 40 to the users 14.

The electronic display devices 270, 272 generally operate in a similar manner to the electronic display device 210 discussed above with reference to FIG. 3, and thus each include a transmitter 220 for coordinating operation of the active shuttering systems 200 of the wearable visualization devices 16. The transmitters 220 of the 3-D display system 42 transmit control signals to the wearable visualization devices 16 of each user 14 to enable the wearable visualization device 16 to shutter the viewing assemblies 18 in a predetermined and controlled manner. As such, the users 14 may each perceive the 3-D images 40 from a respective electronic display device 270, 272 in a focal plane associated with the fixed display 160 of the respective electronic display device 270, 272. As used herein, a focal plane refers to a plane that is perpendicular to an optical axis of wearable visualization device 16, and that intersects objects that are focused within the focal plane. In other words, light rays from a particular point of the 3-D images 40 converge or pass through a focus, before being directed onto a corresponding point on a retina of the user 14. Additionally, in some embodiments, the focus is a focal point, generally separated from the focus of the wearable visualization device 16 by a focal length.

When wearing one of the wearable visualization devices 16, each user 14 may view the AR images 28 presented by the wearable visualization device 16. Additionally, when wearing one of the wearable visualization devices 16 and when facing or oriented toward one of the electronic display devices 270, 272, each user 14 may view the 3-D images 40 presented by the respective electronic display device 270, 272. That is, the active shuttering systems 200 of each wearable visualization device 16 shutters between the two display portions 30, 32 of the wearable visualization devices 16 of each user 14 to enable each user 14 to perceive the 3-D images 40. As discussed above, the active shuttering system 200 of one wearable visualization device 16 utilizes one liquid crystal layer 202 (e.g., first active shuttering lenses), and the active shuttering system 200 of the other wearable visualization device 16 includes another liquid crystal layer 202 (e.g., second active shuttering lenses).

In some embodiments, the users 14 may be assigned to different groups that are each provided individualized 3-D images 40 (e.g., via multiplexer devices and/or demultiplexer devices of the electronic display devices 270, 272). In some embodiments, themes for each of these groups of users 14 are selected based on one or more factors, such as a team to which a user 14 is assigned, a ticket associated with the user 14, a height of the user 14, an age of the user 14 (e.g., as retrieved from a database), a color of clothing worn by the user 14 (e.g., as identified by a camera within the physical environment 260), and so forth. As discussed in more detail with reference to FIGS. 4 and 6, the active shuttering systems 200 of the wearable visualization devices 16 are able to sequentially actuate the wearable visualization devices 16 of each group of users 14, while the 3-D images 40 for each group of users 14 are alternated or multiplexed on the electronic display devices 270, 272 to present different 3-D images 40 to each group of users 14. The AR images 28 displayed via the wearable visualization devices 16 of each group of users 14 are simultaneously adjusted to correspond to the 3-D images 40 that are displayed to each user 14. As such, each user 14 may experience a different or individualized theme on the thrill ride 256.

Figure 5:
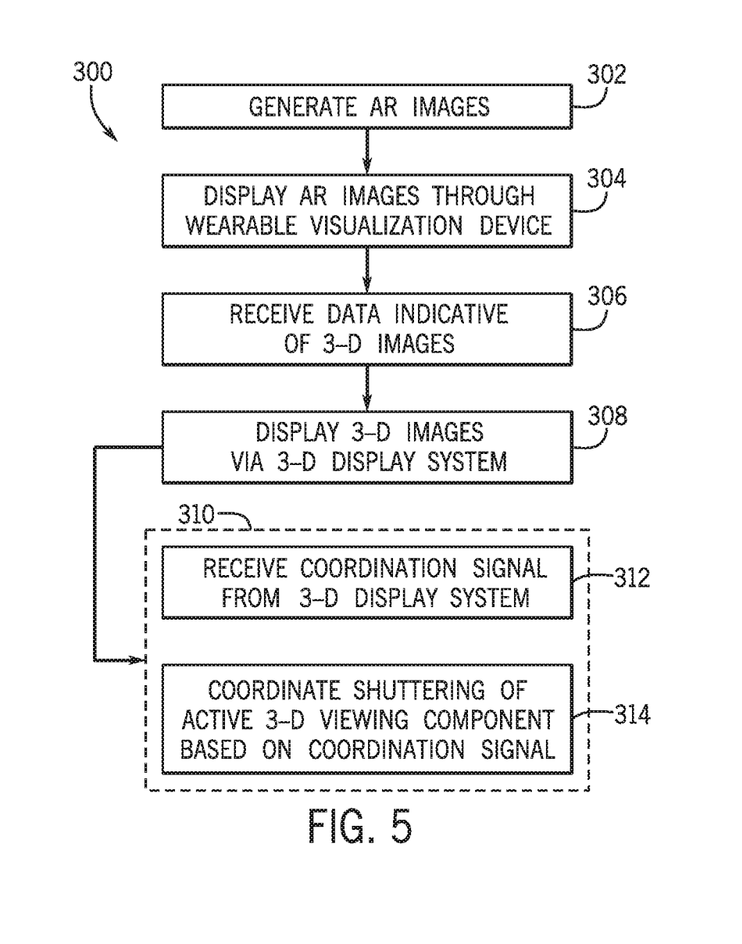
FIG. 5 is a flowchart illustrating an embodiment of a process of operating the AR and 3-D viewing system of FIG. 1, in accordance with present embodiments.

FIG. 5 illustrates a flow diagram of an embodiment of a process 300 to provide AR and 3-D enhancements to amusement park guests (e.g., the user 14). The process 300 may be useful in creating the AR and 3-D experience during an amusement park experience, such as the thrill ride 256. The process 300 may be representative of initiated code or instructions stored in a non-transitory computer-readable medium (e.g., the memory 104, 112, 166, 186) and executed, for example, by the processor 102 of the wearable visualization device 16, the processor 110 of the computer graphics generation system 60, the processor 164 of the 3-D display system 42, and/or the processor 184 of the master controller 62. The processors 102, 110, 164, and/or 184 may be communicatively coupled via a network, such as the wireless network 64, to receive and send the instructions described below.

The process 300 begins with generating (block 302) the AR images 28 to be displayed via the wearable visualization device 16 associated with the user 14. That is, as discussed above, the computer graphics generation system 60 generates the AR images 28, although in other embodiments, the AR images 28 are generated by the processor 102 of the wearable visualization device 16 or the processor 184 of the master controller 62. In some embodiments, the AR images 28 generated by the computer graphics generation system 60 are individualized or customized for the user 14. For example, based on a group associated with the user, a position of the user 14 along the ride path 254, an orientation of the user 14, or any other suitable sensor data related to the user 14, the computer graphics generation system 60 generates the AR images 28 specifically for display to the user 14, in some embodiments. During or after generation of the AR images 28, the computer graphics generation system 60 transmits the AR images 28 to the wearable visualization device 16 via the wireless network 64.

The process 300 includes displaying (block 304) the AR images 28 via the wearable visualization device 16 to the user 14. That is, the microprojector 120 generates and directs the light 122 indicative of the AR images 28 onto the wearable display 124 of the wearable visualization device 16. Because the wearable display 124 of the wearable visualization device 16 is transflective, at least a portion of the light 122 is reflected into the eyes of the user 14, who visualizes the AR images 28 therefrom. As such, the AR images 28 provide a first layer of features viewable by the user 14 in the first focal plane 180 associated with the wearable display 124 of the wearable visualization device 16.

The illustrated embodiment of the process 300 also includes receiving (block 306) data indicative of the 3-D images 40 to be displayed to the user 14 via the fixed display 160 of the 3-D display system 42. As discussed above, in some embodiments in which the fixed display 160 of 3-D display system 42 is provided by the electronic display device 210, the processor 164 of the electronic display device 210 receives the data indicative of the 3-D images 40 from the memory 166 of the electronic display device 210. In some embodiments in which the fixed display 160 is the projector screen 161 and the 3-D display system 42 includes the projector 162, the projector 162 receives the data indicative of the 3-D images 40 from the memory 166 of the projector 162. In other embodiments, the computer graphics generation system 60 generates and provides the data indicative of the 3-D images 40 directly to the projector 162 and/or the electronic display device 210 of the 3-D display system 42. The data indicative of the 3-D images 40 may additionally or alternatively be received from the input/output ports of the projector 162 or the electronic display device 210, retrieved from a database, and so forth.

The process 300 further includes displaying (block 308) the 3-D images 40 via the wearable visualization device 16. The 3-D display system 42 presents the 3-D images 40 on the fixed display 160 associated with the electronic display device 210 or the projector screen 161. It is to be understood that blocks 306 and 308 may be performed simultaneously in some embodiments, such that the 3-D images 40 are received by the processor 164 and displayed on the fixed display 160 of the 3-D display system 42 in real-time. The AR images 28 and the 3-D images 40 may be displayed based on one or multiple factors, including the position or location of the passenger ride vehicle 252 along the ride path 254 (e.g., or other location when the ride path is not present) at any given time point during a cycle of the thrill ride 256, a predetermined distance traveled by the passenger ride vehicle 252 during a cycle of the thrill ride 256, after a predetermined lapse of time, or after one or more actions have been performed by the user 14, and so forth.

By looking through the 3-D viewing component 140 of the wearable visualization device 16 at the fixed display 160 of the 3-D display system 42, the user 14 is able to view the 3-D images 40 in the second focal plane 182 associated with the fixed display 160. As recognized herein, the 3-D images 40 are displayed to the user 14 in combination with the AR images 28 to contribute to the theme of the thrill ride 256 experienced by the user 14. The 3-D images 40 therefore provide a second layer of features that are viewable beyond the first layer of features provided by the displayed AR images 28. In some embodiments, the master controller 62 coordinates operation of the wearable visualization device 16 and the 3-D display system 42 (e.g., via feedforward control) to provide a seamlessly multi-dimensional experience.

In embodiments of the wearable visualization device 16 having the active shuttering system 200 with the liquid crystal layer 202 as the 3-D viewing component 140, the step of displaying (block 308) the 3-D images 40 via the 3-D display system 42 of the present embodiment of the process 300 includes additional steps, as represented within dotted box 310. That is, in some embodiments, the process 300 includes receiving (block 312) a coordination signal from the transmitter 220 of the 3-D display system 42. The receiver 222 of the wearable visualization device 16 receives the coordination signal from the transmitter 220 at any suitable rate or frequency. In some embodiments, the receiver 222 receives the coordination signal both when the wearable visualization device 16 is and is not oriented toward the transmitter 220. The step of displaying (block 308) the 3-D images 40 via the 3-D display system 42 also includes, in some embodiments, coordinating (block 314) shuttering of the liquid crystal layer 202 of the wearable visualization device 16 based on the coordination signal. In other words, the wearable visualization device 16 alternatively shutters open or closed the liquid crystal layer portions for each display portion 30, 32 of the viewing assembly 18, while the 3-D display system 42 presents alternating perspectives of the 3-D images 40 displayed to enable the user 14 to perceive the 3-D images 40 therefrom.

In some embodiments having multiple fixed displays 160, such as introduced above with reference to FIG. 4, the wearable visualization device 16 may generate specific AR images 28 to coordinate with the 3-D images 40 viewable on the fixed display 160 that the user 14 is facing. As such, the receiver 222 of the wearable visualization device 16 may utilize the coordination signal received from the fixed display 160 of the 3-D display system 42 toward which the wearable visualization device 16 is oriented. In some embodiments, the master controller 62 functions as the transmitter 220, which may be omitted. In such embodiments, the master controller 62 provides the timing or control signals to the fixed displays 160, which follow a master-slave control algorithm (e.g., without additional timing components). The one or multiple fixed displays 160 of the 3-D display system 42 may therefore display the 3-D images 40 so that the users 14 may perceive the 3-D images 40 within the second focal plane 182, while simultaneously perceiving the AR images 28 within the first focal plane 180. Moreover, in some embodiments having the liquid crystal layer 202, the liquid crystal layer 202 may be divided into various pixel portions that may be individually and selectively actuated to correspond to or mirror the AR images 28 displayed on the wearable display 124. As such, the liquid crystal layer 202 may be controlled to turn opaque to block ambient light and increase contrast for more efficient viewing of the AR images 28.

Figure 6:
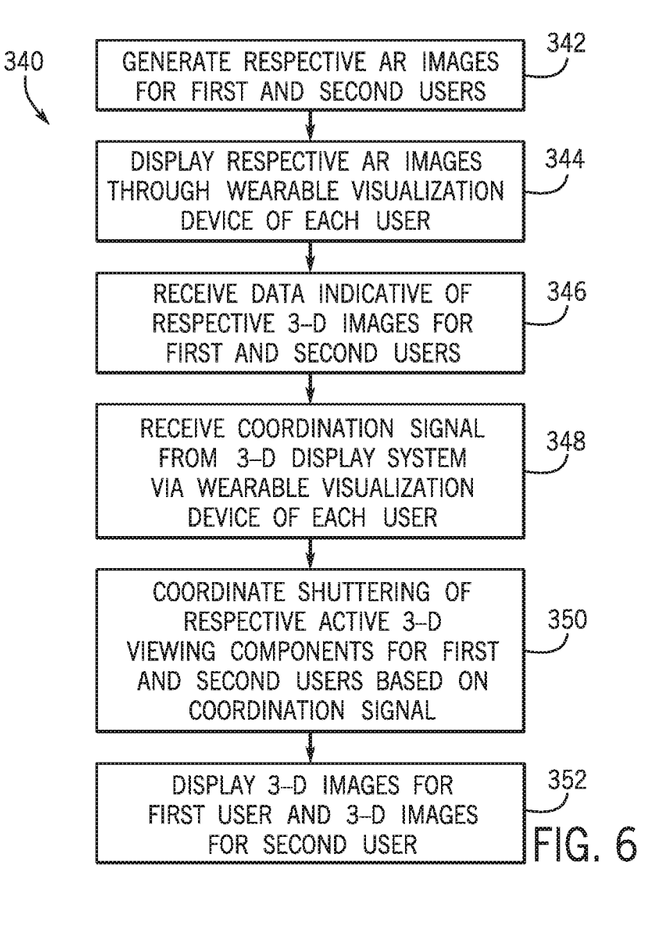
FIG. 6 is a flowchart illustrating an embodiment of a process of operating the AR and 3-D viewing system of FIG. 1 having an active 3-D viewing component, in accordance with present embodiments.

FIG. 6 illustrates a flow diagram of an embodiment of a process 340 to provide AR and 3-D experiences to multiple users 14 utilizing the wearable visualization device 16 with the active shuttering systems 200. The process 340 may be useful in creating the AR and 3-D experience that is individualized for each user 14. Similar to the process 300, the process 340 may be representative of initiated code or instructions stored in a non-transitory computer-readable medium (e.g., the memory 104, 112, 166, 186) and executed, for example, by the processor 102 of the wearable visualization device 16, the processor 164 of the 3-D display system 42, the processor 110 of the computer graphics generation system 60, and/or the processor 184 of the master controller 62. The processors 102, 110, 164, and/or 184 are communicatively coupled together via the wireless network 64 or any other suitable communication components to receive and send the instructions described below.

As noted herein, the process 340 is similar to the process 300, but more specifically directed to providing individualized AR and 3-D experiences to multiple users 14 having wearable visualization devices 16 with active shuttering systems 200. For example, the process 340 includes generating (block 342) respective AR images 28 for a first user 14 and for a second user 14. Similar to block 302 of process 300, the AR images 28 are generated by the computer graphics generation system 60 for each user 14 based on certain factors associated with each user 14. For example, the AR images 28 may be generated based on a direction faced by the user 14, a position of the user 14 within the passenger ride vehicle 252, a group to which each user 14 is assigned, a position of the passenger ride vehicle 252 along the ride path 254, and so forth. Similar to block 304 of process 300, the process 340 also includes displaying (block 344) the AR images 28 through the respective wearable visualization device 16 associated with each user 14. In this manner, a first user 14 may view a first set of the AR images 28 that are customized for the first user 14, while the second user 14 may view a second set of the AR images 28 that are customized for the second user 14.

With respect to displaying the 3-D images 40, similar to block 306 of process 300, the process 340 includes receiving (block 346) data indicative of the 3-D images 40 to be displayed to each user 14. For example, the electronic display devices 270, 272 retrieves the 3-D images 40 to be displayed from the respective memory 166 of the electronic display devices 270, 272. In other embodiments, the computer graphics generation system 60 generates the 3-D images 40 for each user 14 in-situ based on sensor data collected by the wearable visualization devices 16 associated with each user 14, then provides the 3-D images 40 to the electronic display devices 270, 272. In some embodiments, the 3-D images 40 are provided to the 3-D display system 42 as a multiplexed signal, which is demultiplexed by the 3-D display system 40 for individualized display to the users 14.

Moreover, the process 340 includes receiving (block 348) the coordination signal from the 3-D display system 42. That is, the receivers 222 of the wearable visualization devices 16 receive the coordination signals from the transmitters 220 of the electronic display devices 270, 272. The present embodiment of the process 340 also includes coordinating (block 350) shuttering of the respective active shuttering systems 200 of the wearable visualization devices 16. That is, the active shuttering systems 200 of the wearable visualization devices 16 are sequentially actuated (e.g., opened, made transparent) in a particular order to provide customized 3-D images 40 to each user 14. For example, the active shuttering systems 200 may be coordinated to sequentially actuate one of: the first display portion 30 of the active shuttering lenses of the wearable visualization device 16 of a first user 14 (or group of users) during a first time period, the first display portion 30 of the active shuttering lenses of the wearable visualization device 16 of a second user 14 during a second time period, the second display portion 32 of the active shuttering lenses of the wearable visualization device 16 of the first user 14 during a third time period, and the second display portion 32 of the active shuttering lenses of the wearable visualization device 16 of the second user 14 during a fourth time period. The sequence may be rapidly repeated, such that each eye portion is actuated between 50 to 100 times per second. As noted herein the first, second, third, and fourth time periods are offset from one another in some embodiments. Simultaneously, the process 340 includes displaying (block 352) respective 3-D images 40 on the electronic display devices 270, 272 to be viewed by the users 14. The AR images 28 displayed via the wearable visualization devices 16 of each user 14 are simultaneously adjusted to correspond to the 3-D images 40 that are displayed to each user 14.

In other words, for embodiments of the wearable visualization device 16 having the active shuttering system 200, two or more time-overlapped 3-D presentations may be near-simultaneously presented to the users 14 to provide individualized 3-D images 40 for the first user 14 (e.g., one or more deciphered 3-D features) and individualized 3-D images 40 for the second user 14 (e.g., one or more second deciphered 3-D features), even from a single fixed display 160. Although described with reference to two users 14, it is to be understood that similar concepts to those discussed with reference to the process 340 may be utilized to provide individualized 3-D and AR content to any suitable number of users 14 or groups thereof. Accordingly, the AR and 3-D viewing system disclosed herein may adaptively adjust a theme of the thrill ride 256 or contribute to any other suitable environment to provide individualized and immersive content via multiple focal planes to users 14.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An augmented reality (AR) and 3-dimensional (3-D) viewing system for providing an AR and 3-D experience to a user, comprising:
  a show controller;
  a wearable visualization device communicatively coupled to the show controller and comprising a viewing assembly through which the user is capable of viewing a real-world environment, wherein the viewing assembly comprises:
    a first display configured to display one or more AR features; and
    a 3-D viewing component that enables the user to perceive a plurality of coded 2-dimensional (2-D) images as one or more deciphered 3-D features, wherein the 3-D viewing component comprises active shuttering lenses, and wherein the viewing assembly is configured to coordinate actuation of the active shuttering lenses during a first periodic time interval;
  a second wearable visualization device comprising a second viewing assembly that comprises:
    a second display configured to display one or more second AR features; and
    second active shuttering lenses that enable a second user to perceive a plurality of second coded 2-D images as one or more second deciphered 3-D features, wherein the second viewing assembly is configured to coordinate actuation of the second active shuttering lenses during a second periodic time interval, offset from the first periodic time interval, and wherein the one or more deciphered 3-D features and the one or more second deciphered 3-D features are different from one another; and
  a 3-D display system communicatively coupled to the show controller and comprising a plurality of third displays, wherein each third display of the plurality of third displays is configured to display respective portions of the plurality of coded 2-D images and the plurality of second coded 2-D images based on control signals provided to the 3-D display system by the show controller, and wherein the 3-D display system is disposed within the real-world environment.

2. The AR and 3-D viewing system of claim 1, wherein the 3-D viewing component comprises light-filtering coatings disposed on the first display.

3. The AR and 3-D viewing system of claim 2, wherein the light-filtering coatings comprise a first anaglyph lens filter for a first portion of the first display and a second anaglyph lens filter for a second portion of the first display.

4. The AR and 3-D viewing system of claim 2, wherein the light-filtering coatings comprise a first polarized lens filter for a first portion of the first display and a second polarized lens filter for a second portion of the first display.

5. The AR and 3-D viewing system of claim 1, wherein the active shuttering lenses comprise a liquid crystal layer disposed adjacent to the first display, wherein a first portion of the liquid crystal layer is configured to turn opaque in response to a control signal, and wherein a second portion of the liquid crystal layer is configured to turn or remain transparent in response to the control signal.

6. The AR and 3-D viewing system of claim 1, wherein the 3-D display system comprises a projector configured to transmit the respective portions of the plurality of coded 2-D images onto at least one third display of the plurality of third displays, and wherein the at least one third display comprises a projector screen.

7. The AR and 3-D viewing system of claim 1, wherein at least one third display of the 3-D display system comprises an electronic display device configured to generate and display the respective portions of the plurality of coded 2-D images.

8. The AR and 3-D viewing system of claim 1, wherein the one or more deciphered 3-D features are individualized for the user, and wherein the one or more second deciphered 3-D features are individualized for the second user.

9. The AR and 3-D viewing system of claim 1, wherein the active shuttering lenses are disposed adjacent to the first display, wherein the second active shuttering lenses are disposed adjacent to the second display, and wherein the 3-D display system comprises a transmitter configured to transmit a signal that enables the active shuttering lenses and the second active shuttering lenses to synchronize with a refresh rate of the 3-D display system.

10. The AR and 3-D viewing system of claim 9, wherein the show controller is configured to enable the one or more deciphered 3-D features and the one or more second deciphered 3-D features to be different from one another by:
    actuating a first display portion of the active shuttering lenses during a first time period;
    actuating a second display portion of the active shuttering lenses during a second time period;
    actuating a first display portion of the second active shuttering lenses during a third time period; and
    actuating a second display portion of the second active shuttering lenses during a fourth time period, wherein the first, second, third, and fourth time periods are offset from one another.

11. The AR and 3-D viewing system of claim 1, wherein left eye portions of the plurality of coded 2-D images are offset relative to right eye portions of the plurality of coded 2-D images to enable the user to perceive the one or more deciphered 3-D features.

12. The AR and 3-D viewing system of claim 1, wherein the show controller comprises a processor configured to instruct a computer graphics generation system to instruct each third display of the plurality of third displays to display the respective portions of the plurality of coded 2-D images based on an orientation of the user, a position of the user, a motion of the user, or a combination thereof.

13. An augmented reality (AR) and 3-dimensional (3-D) viewing system for providing an AR and 3-D experience to a user, comprising:
    a wearable visualization device that comprises a viewing assembly through which the user is capable of viewing a real-world environment, wherein the viewing assembly comprises:
        a first display configured to display one or more AR features; and
        a 3-D processing assembly comprising a first 3-D filtering layer for a first eye portion of the first display and a second 3-D filtering layer for a second eye portion of the first display, wherein the first 3-D filtering layer and the second 3-D filtering layer cooperate to enable the user to perceive a plurality of coded 2-dimensional (2-D) images as one or more deciphered 3-D features, wherein the 3-D processing assembly comprises active shuttering lenses, and wherein the viewing assembly is configured to coordinate actuation of the active shuttering lenses during a first periodic time interval;
    a second wearable visualization device comprising a second viewing assembly that comprises:
        a second display configured to display one or more second AR features; and
        second active shuttering lenses that enable a second user to perceive a plurality of second coded 2-D images as one or more second deciphered 3-D features, wherein the second viewing assembly is configured to coordinate actuation of the second active shuttering lenses during a second periodic time interval, offset from the first periodic time interval, and wherein the one or more deciphered 3-D features and the one or more second deciphered 3-D features are different from one another; and
    a 3-D display system separate from the wearable visualization device and the second wearable visualization device, wherein the 3-D display system comprises a plurality of third displays, wherein each third display of the plurality of third displays is configured to present respective portions of the plurality of coded 2-D images to the wearable visualization device and present respective portions of the plurality of second coded 2-D images to the second wearable visualization device in response to receiving control signals from a show controller.

14. The AR and 3-D viewing system of claim 13, wherein the respective portions of the plurality of coded 2-D images presented by each third display of the plurality of third displays comprise relatively offset perspectives of an object, and wherein the 3-D processing assembly enables the user to optically decode the respective portions of the plurality of coded 2-D images by perceiving the object as having depth from the offset perspectives of the object.

15. The AR and 3-D viewing system of claim 13, wherein the first 3-D filtering layer comprises a first coating having a first optical effect, wherein the second 3-D filtering layer comprises a second coating having a second optical effect that is different from the first optical effect.

16. The AR and 3-D viewing system of claim 13, wherein the first 3-D filtering layer comprises a first active shutter lens and wherein the second 3-D filtering layer comprises a second active shutter lens.

17. An augmented reality (AR) and 3-dimensional (3-D) viewing system for providing an AR and 3-D experience to a user, comprising:
    a wearable visualization device comprising a viewing assembly through which the user is capable of viewing a real-world environment, wherein the viewing assembly comprises:
        a first display configured to display one or more AR features within a first focal plane; and
        a 3-D viewing component that enables the user to perceive a plurality of coded 2-dimensional (2-D) images as one or more deciphered 3-D images within at least one second focal plane, wherein the first focal plane and the at least one second focal plane are independent of one another, wherein the 3-D viewing component comprises active shuttering lenses, and wherein the viewing assembly is configured to coordinate actuation of the active shuttering lenses during a first periodic time interval;

a second wearable visualization device comprising a second viewing assembly that comprises:
   a second display configured to display one or more second AR features within a third focal plane; and
   second active shuttering lenses that enable a second user to perceive a plurality of second coded 2-D images as one or more second deciphered 3-D features within at least one fourth focal plane, wherein the second viewing assembly is configured to coordinate actuation of the second active shuttering lenses during a second periodic time interval, offset from the first periodic time interval, and wherein the one or more deciphered 3-D features and the one or more second deciphered 3-D features are different from one another;

a 3-D display system comprising a plurality of third displays, wherein each third display of the plurality of third displays is configured to display respective portions of the plurality of coded 2-D images and the plurality of second coded 2-D images;

a computer graphics generation system comprising a processor configured to:
   generate the one or more AR features and the one or more second AR features, provide the one or more AR features to the wearable visualization device, and provide the one or more second AR features to the second wearable visualization device; and
   generate the plurality of coded 2-D images and the plurality of second coded 2-D images and provide the respective portions of the plurality of coded 2-D images and the plurality of second coded 2-D images to each third display of the plurality of third displays; and a show controller configured to operatively communicate with the wearable visualization device, the second wearable visualization device, and the 3-D display system to coordinate presentation of the one or more AR features, the one or more second AR features, the plurality of coded 2-D images, and the plurality of second coded 2-D images.

18. The AR and 3-D viewing system of claim 17, wherein the processor of the computer graphics generation system is configured to generate the one or more AR features and the plurality of coded 2-D images based on an orientation of the user, a position of the user, a motion of the user, or a combination thereof.

* * * * *